(12) United States Patent
Tumuluru et al.

(10) Patent No.: US 8,990,851 B2
(45) Date of Patent: Mar. 24, 2015

(54) SYSTEM AND METHOD FOR USING EMERGENCY ALERT SYSTEM MESSAGES

(71) Applicant: Google Technology Holdings LLC, Mountain View, CA (US)

(72) Inventors: Sundar Murthy Tumuluru, Bangalore (IN); Christopher S. Del Sordo, Souderton, PA (US); Krishna Prasad Panje, Bangalore (IN); Sudha Sundaram, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/827,548

(22) Filed: Mar. 14, 2013

(65) Prior Publication Data

US 2014/0282704 A1    Sep. 18, 2014

(51) Int. Cl.
*H04N 7/10* (2006.01)
*H04N 21/488* (2011.01)
*H04N 21/81* (2011.01)

(52) U.S. Cl.
CPC ......... *H04N 21/4882* (2013.01); *H04N 21/814* (2013.01)
USPC ........................................... 725/33; 725/149

(58) Field of Classification Search
CPC ... H04N 21/814; H04H 20/59; H04L 12/1895
USPC .............................................. 725/33, 35, 149
See application file for complete search history.

(56) References Cited

U.S. PATENT DOCUMENTS

| | | | |
|---|---|---|---|
| 8,490,129 B2 * | 7/2013 | Phillips et al. | 725/33 |
| 2008/0101473 A1 * | 5/2008 | Tanaka et al. | 375/240.16 |
| 2009/0128359 A1 * | 5/2009 | Whattam | 340/825.49 |
| 2009/0133056 A1 * | 5/2009 | Yun | 725/33 |
| 2009/0271818 A1 | 10/2009 | Schlack | |
| 2010/0205646 A1 * | 8/2010 | Potrebic et al. | 725/151 |
| 2012/0002717 A1 * | 1/2012 | Ma et al. | 375/240.01 |
| 2014/0007158 A1 * | 1/2014 | Bhagwat | 725/33 |

OTHER PUBLICATIONS

ANSI/SCTE 18 2007 Emergency Alert Messaging for Cable.*
Society of Cable Telecommunications Engineers, Inc., "Emergency Alert Messaging for Cable", ANSI/SCTE 18 2007 (J-STD-042A-2007: A Joint Standard Developed by SCTE and CEA), 2007, 31 pages.

* cited by examiner

*Primary Examiner* — Benjamin R Bruckart
*Assistant Examiner* — Tien M Nguyen
(74) *Attorney, Agent, or Firm* — Fish & Richardson P.C.

(57) ABSTRACT

A home gateway (102) includes a receiving component (106), a reformatting (109) component, a transcoding component (107), and a transmitting component (110). The receiving component (106) can receive an emergency alert system message in a first format. The reformatting component (109) can output a reformatted emergency alert system message in a second format, wherein the reformatted emergency alert system message is based on the received emergency alert system message. The transcoding component (107) may transcode content of the received emergency alert system message. The transmitting component (110) can transmit a notification, based on the reformatted emergency alert system message, to a client device (104).

14 Claims, 8 Drawing Sheets

__US 8,990,851 B2__

SYSTEM AND METHOD FOR USING EMERGENCY ALERT SYSTEM MESSAGES

BACKGROUND

The Emergency Alert System (EAS) signaling scheme allows a cable operator to disseminate emergency alert information related to national, state, and local emergencies and warnings in an efficient way. While it is possible for a cable operator to comply with EAS requirements by simply replacing the source signal for all programs with an emergency information channel, such switching may be disruptive to viewing, overly intrusive for many kinds of local warnings, and overly-complex for the cable operator to implement in a digital cable environment where each transport stream may carry many programs that would have to be individually interrupted.

BRIEF SUMMARY OF THE DRAWINGS

The accompanying drawings, which are incorporated in and form a part of the specification, illustrate example embodiments and, together with the description, serve to explain the principles. In the drawings.

DETAILED DESCRIPTION

Each EAS message may contain an alert priority value that indicates the priority of the alert. A value of 0 may indicate that the EAS contains only a text message as its emergency service content. EAS messages with an alert priority of 0 may be discarded by receiving devices, except those designed to acknowledge and process text messages. An alert priority value of 3 may indicate that the EAS message has a low priority. EAS messages with an alert priority of 3 may be disregarded if processing the alert would interrupt viewing of an access-controlled service. An alert priority value of 7 may indicate that the EAS message has a medium priority. EAS messages with an alert priority of 7 may be disregarded if processing the alert would interrupt viewing of a pay-per-view or video on demand event. An alert priority value of 11 may indicate that the EAS message has a high priority. EAS messages with an alert priority of 11 may be processed unconditionally, but can involve text-only display if no audio is available. An alert priority of 15 may indicate that the EAS message has a maximum priority. A details channel associated with the EAS message may be available. EAS messages with an alert priority of 15 may be processed unconditionally and also include a details channel pointer so that a communication device may tune to the details channel and receive textual, graphical, video, and/or audio emergency service content.

If audio is available without tuning to the details channel, that audio is substituted for program audio for the duration of the EAS message. If audio is not available by means other than tuning to the details channel, the receiving device acquires the details channel for the duration of the EAS message.

When an EAS message is sent with an alert priority of 15, a pointer may be included that points to a details channel for use when the receiving device is navigating using out-of-band service information, and it can include a pointer for use when out-of-band service information is not available.

EAS messages may also contain a sequence number indicating the number of the EAS message. The sequence number is incremented by 1 when any change occurs in the information carried in the EAS message. Receiving devices can process the sequence number in order to detect and discard duplicate transmissions. Duplicate transmissions of each EAS message are sent to overcome possible message loss due to communication channel noise.

Figure 8:
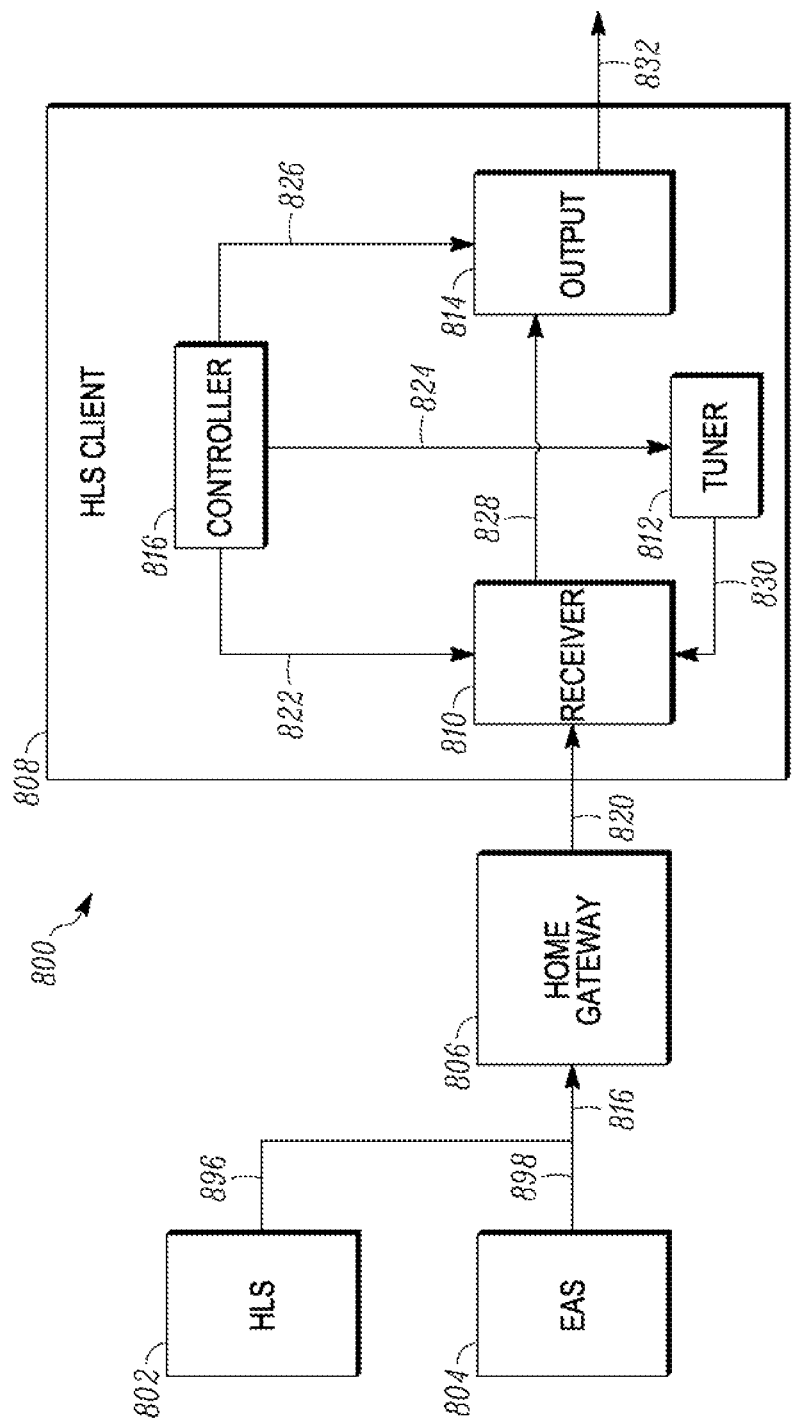
FIG. 8 illustrates a block diagram for a prior art HTTP Live Streaming (HLS) system.

FIG. 8 illustrates a block diagram for a prior art HTTP Live Streaming (HLS) system 800.

In HLS system 800, HLS content and EAS content are provided from a respective headend to, eventually, a client device. In this example, an HLS server 802 is a headend and an emergency alert system (EAS) 804 is a headend. HLS system 800 includes HLS server 802, EAS 804, a home gateway 806, and an HLS client 808. HLS client 808 further includes a receiving component 810, a tuning component 812, an output component 814 and a controlling component 816.

HLS server 802 is operable to provide content in-band in multiple streams with varying bit rates to home gateway 806 via signal 896. HLS breaks up source content into a sequence of small HTTP-based file downloads, and each download is a small part of the overall content. Each small HTTP-based file is encoded at multiple bit rates, then each of the different bit rate streams are segmented into small multi-second parts, which are typically two to ten seconds long. At this point, the HLS server may send the home gateway a manifest file that contains the bit rates of all available streams and a list of segments for each available stream.

EAS 804 is operable to send an EAS message to home gateway 806 via signal 898. In an example embodiment, the EAS message is formatted in accordance with SCTE-18. SCTE, the Society of Cable Telecommunications Engineers, is a non-profit professional association for the advancement of technology related to telecommunications engineering. SCTE is accredited by the American National Standards Institute (ANSI). SCTE-18 is a revised EAS standard issued by SCTE. An EAS message may include a header and a payload, wherein the payload may include a tuning message, a channel identifier, and/or scrolling text. Non-limiting examples of reasons for sending an EAS message from EAS 804 include warnings of severe weather, a presidential address, or an announcement from local authorities.

Home gateway 806 is operable to receive content from HLS server 802 and an EAS message from EAS 804 via a combined signal 816. Home gateway 806 is additionally operable to transmit content or an EAS message to HLS client 808 via signal 820.

At the start, the home gateway 806 begins downloading segments from HLS server 802 at the lowest available bit rate. If the home gateway finds that the download speed available is greater than the bit rate of the segments being downloaded, it may request that the following segments be sent at the next higher bit rate. If the home gateway finds that the download speed available is less than the bit rate of the segments being downloaded, it may request the following segments be sent at the next lower bit rate.

As segments are downloaded, the home gateway may construct a playlist that contains the order in which the downloaded segments should be sent to the HLS client. The HLS client 808 may then play the segments in that order as they are received from the home gateway. Home gateway 806 may process a received EAS message as necessary and deliver it to HLS client 808 out-of-band. In this context, "out-of-band" or OOB refers to the Extended Channel interface defined in ANSI/SCTE 28 2004.

Controlling component 816 is operable to control operation of receiving component 810 via control signal 822. Controlling component 816 is additionally operable to control operation of tuning component 812 via control signal 824. Controlling component 816 is further operable to control operation of output component 814 via control signal 826. Tuning component 812 is in communication with and operable to tune receiving component 810 to the frequency at which home gateway 806 is transmitting.

HLS client 808 is operable to receive content and an EAS message from home gateway 806 via receiving component 810 and signal 820. HLS client 808 is additionally operable to output content and an EAS message from home gateway 806 via output component 814 and signal 832 to an electronic display and audio speakers (not shown).

In operation, a user may want to stream content from HLS server 802. Home gateway 806 may begin by downloading a manifest file that contains all available stream bit rates and a list of segments for each available stream. Home gateway 806 begins downloading segments at the lowest available bit rate via signal 896, 816. As segments are downloaded, home gateway 806 may construct a playlist that contains the order in which each segment should be transmitted to HLS client 808. Home gateway 806 then begins to transmit the segments to HLS client 808.

Tuning component 812 instructs receiving component 810 via signal 830 to tune to the frequency at which home gateway 806 is transmitting segments. Receiving component 810 sends each segment to output component 814 via signal 828. Control component 816 controls output component 814 to send each segment it receives via signal 828 to a display component (not shown) of HLS client 808 via signal 832.

When activated, EAS 804 may transmit an EAS message to home gateway 806 via signal 896. When home gateway 806 receives the EAS message via signal 896, it inserts the EAS message into the constructed playlist between segments that are being downloaded from HLS server 802.

Home gateway 806 continues to send downloaded segments to receiving component 810 of HLS client 808. When home gateway 806 reaches the EAS message in the playlist, it may send the EAS message to receiving component 810 of HLS client 808.

Receiving component 810 may send emergency service content related to the EAS message to output component 814 via signal 828. Control component 816 may instruct output component 814 via signal 826 to then send the emergency service content to an audiovisual display component of HLS client 808 via signal 832. At this time the content being streamed from HLS server 802 is interrupted and the EAS emergency service content displays. After the EAS emergency service content has been displayed, home gateway 806 resumes sending segments downloaded from HLS sever 802 as instructed by the playlist.

One problem with conventional HLS systems is that the HLS client is not given an option of whether or not to display the EAS emergency service content. The EAS message is automatically transmitted to the HLS client when the home gateway reaches the message in the playlist. Automatically displaying the EAS emergency service content interrupts the content that is being streamed from the HLS server.

Another problem with conventional HLS systems is that HLS clients that are unable to process a received EAS message that is in a format other than SCTE-18 format may not possess the proper software and decoding ability to display emergency service content. In this case, the EAS emergency service content is not displayed, but service is still interrupted because home gateway 806 inserted the message into its playlist despite incompatibilities between the EAS message and/or content formats.

To address these problems, a device may be provided for use with an EAS message in a first format. The system includes a home gateway, a reformatting component, and an HLS client. The reformatting component is arranged to receive an EAS message and generate a second EAS message (an EAS notification) based on the received EAS message. Also, to address these problems, a system is provided for use with an EAS message. The system includes a home gateway and an HLS client. The home gateway is arranged to receive an HLS channel and a second HLS channel.

Because some HLS clients in use today may not possess the ability to process some EAS emergency service content in a particular format, a system and method for using EAS messages transcodes EAS emergency service content into a second format that the HLS clients can process. Further, a system for using EAS messages may include a secondary tuner dedicated to receiving EAS emergency service content. The system with a second tuner allows an end user to decide whether or not to view the issued EAS emergency service content based on the priority of the EAS message.

Additional advantages are set forth in part in the description which follows, and in part will become apparent to those skilled in the art upon examination of the following or may be learned by practice.

Embodiments herein provide a plurality of novel aspects to viewing EAS messages. In one aspect, a home gateway transcodes received EAS emergency service content from one type of media coding format to another type of media coding format, e.g., transcoding a received EAS message from an MPEG2 coding format into H.264 coding format or transcoding a received EAS message from an H.264 coding format into an MPEG2 coding format.

In another aspect, a home gateway is able to reformat a received EAS message in SCTE-18 format by creating an EAS notification in a format such as a modified EAS-CO format, a modified EAS-FT format, or a modified SCTE-8 format, or other variants. For example, when an EAS message is received, it can be stored in a buffer or memory component of the home gateway. As opposed to sending the EAS message directly to the HLS client, an EAS notification is transmitted to the HLS client. Upon receiving the EAS notification, the user of the HLS client may decide whether to view the EAS emergency service content. If a user decides not to view the emergency service content, any stored emergency service content is simply discarded. If a user decides to view the emergency service content, the home gateway can switch to the transcoded EAS message playlist and begin transmitting segments of the transcoded EAS emergency service content to the HLS client. Conventional EAS messages are transmitted in a format understandable by devices that are unable to process the EAS message as reformatted by a home gateway as disclosed herein. For example, the EAS message in its original format from EAS 804 may be SCTE-18, whereas a reformatted EAS message may be in a proprietary format that is different than SCTE-18. Further, some HLS clients may be unable to understand the EAS message as reformatted by a home gateway as disclosed herein.

In another aspect, a second tuner is provided in the home gateway and the second tuner is directed to receive EAS emergency service content. The use of a second tuner enables the first tuner to continue to download segments of media content from an HLS server. The secondary tuner can then either store the EAS emergency service content in a buffer or memory component until it is ready to be viewed, or it can send the message to a transcoding component. After the message has been transcoded, it can then be sent to a buffer or memory component that can store the message until it is ready to be sent to an HLS client.

In another aspect, a plurality of tuners are provided, wherein one of the plurality of tuners may be directed to receive EAS emergency service content. In some embodiments, any tuner that is not currently receiving content may be directed to receive the EAS emergency service content. In some embodiments, one of the plurality of tuners is dedicated to receive the EAS emergency service content.

The above-discusses aspects will be described in more detail with reference to FIGS. 1-7.

Figure 1:
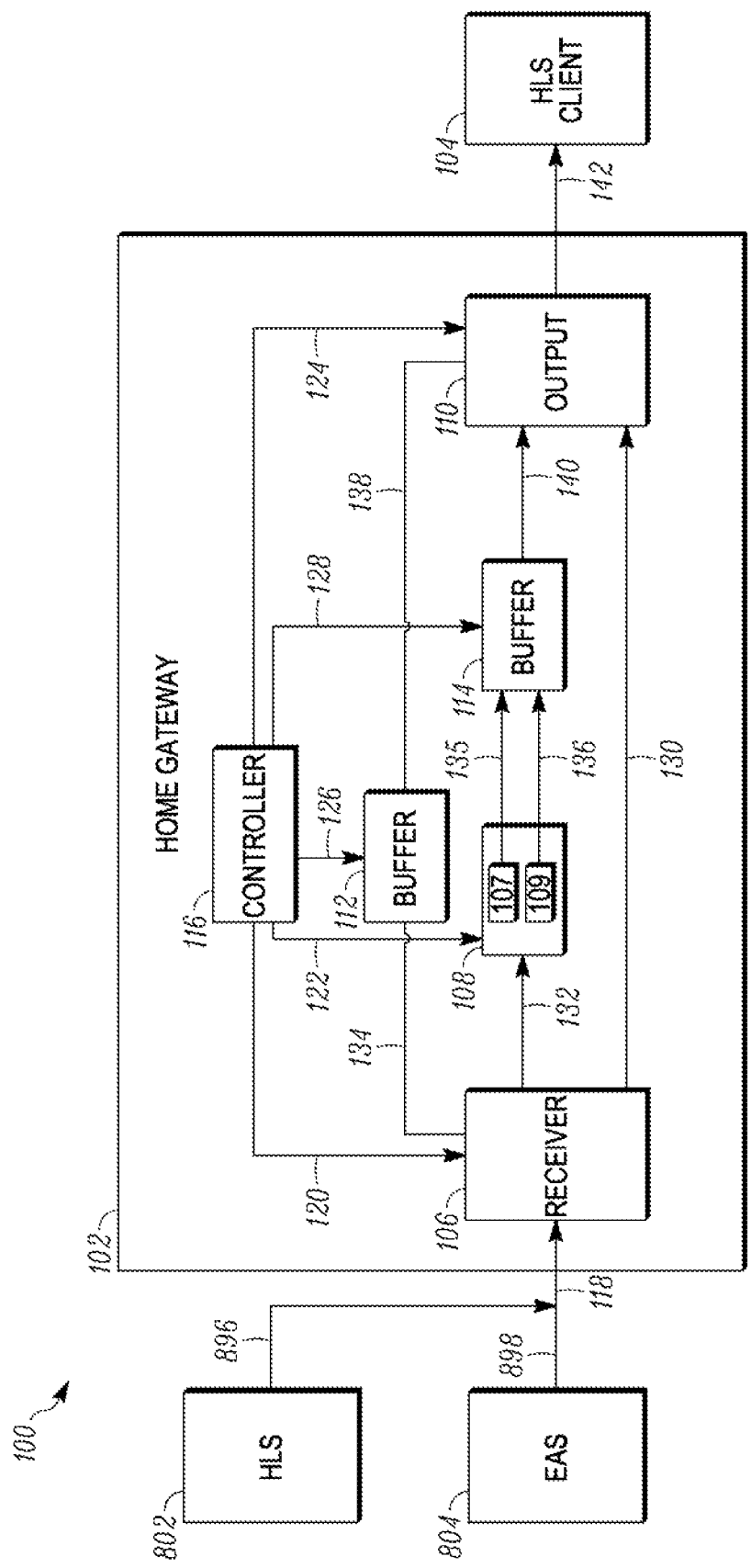
FIG. 1 illustrates an example HTTP live stream system.

FIG. 1 illustrates an example HTTP live stream system 100. HTTP is used herein as an example for purposes of discussion. It should be noted that any hypermedia-based media streaming communications protocol may be used, wherein hypermedia includes graphics, audio, video, plain text, and/or hyperlinks that may intertwine to create a generally non-linear medium of information. Therefore, HTTP as used herein, may include any hypermedia-based media protocol and HLS as used herein may include any hypermedia-based media streaming communications protocol.

FIG. 1 includes a few elements of FIG. 8, namely, HLS server 802 and EAS 804. Additionally it includes a home gateway 102 and an HLS client 104. Home gateway 102 further includes a receiving component 106, a reformatting component 108, an output component 110, a buffer 112, a buffer 114, and a controlling component 116. For purposes of brevity, elements (and their respective functions) that are common between FIG. 8 and FIG. 1 may not be described again. Reformatting component 108 includes a transcoding component 107 and a notification component 109.

In this example, reformatting component 108, output component 110, buffer 112, buffer 114 and controlling component 116 are distinct components. However, in other embodiments, at least two of receiving component 106, reformatting component 108, output component 110, buffer 112, buffer 114, and controlling component 116 may be combined as a unitary component. Further, in some embodiments, at least one of reformatting component 108, and controlling component 116 may be implemented as a non-transient, tangible computer-readable media for carrying or having computer-executable instructions or data structures stored thereon.

Similarly, in this example, transcoding component 107 and notification component 109 are distinct components. However, in other embodiments, transcoding component 107 and notification component 109 may be combined as a unitary component. Further, in some embodiments, at least one of transcoding component 107 and notification component 109 may be implemented as a non-transient, tangible computer-readable media for carrying or having computer-executable instructions or data structures stored thereon.

Receiving component 106 is operable to receive streamed content from HLS server 802 and an OOB EAS message in a first format from EAS 804 via signal 118. Receiving component 106 is additionally operable to send content or an EAS message to buffer 112 via signal 134 or reformatting component 108 via signal 132.

Buffer 112 is operable to store a first buffered message based on the received EAS message. In some example embodiments, the stored first buffered message may be the received EAS message. In some example embodiments, the stored first buffered message may include the EAS emergency service content (e.g., video/audio content) in accordance with the tuning message or channel ID from the EAS message payload. Buffer 114 is operable to store a second buffered message based on the reformatted EAS message and/or the transcoded EAS emergency service content.

Transcoding component 107 is operable to transcode an EAS emergency service content it receives from receiving component 106 from a first format to a second format. As technology has developed, the types of HLS clients and media formats that those HLS clients use has multiplied. In a single day, one can come into contact with multiple presentations of the same content, served in different coding formats. For example, a person may watch the same news transmission on a high definition television, a cellphone, or on a laptop. All these devices would be presenting the same content, but using different coding formats to support different resolutions, sampling rates, etc. Further, different manufacturers of one type of HLS client, e.g. different proprietary set-top boxes, may be compatible with different codecs. To account for compatibility of many devices transcoding component 107 is operable to transcode EAS emergency service content from its original coding format to a new coding format. In a non-limiting example, transcoding component 107 may transcode received EAS emergency service content from an MPEG2 format to an H.264 format. In another non-limiting example, transcoding component 107 may transcode received EAS emergency service content from an H.264 format to an MPEG2 format. The transcoded EAS emergency service content is sent to buffer 114 via signal 135, to output component 110 via signal 140, and then to HLS client 104 via signal 142.

Notification component 109 is additionally operable to reformat the EAS message it receives from receiving component 106 into an EAS notification. The EAS notification is sent to buffer 114 via signal 136, to output component 110 via signal 140, and then to HLS client 104 via signal 142.

Output component 110 is operable receive an EAS message from buffer 112 via signal 138, and to transmit the EAS message to HLS client 104 via signal 142. Output component is further operable to receive a reformatted EAS notification from buffer 114 via signal 140, and to transmit the reformatted EAS notification to HLS client 104 via signal 142.

Output component 110 is operable to transmit an indicator, based on the reformatted EAS notification, to a client device 104, non-limiting examples of which include a television, tablet computer, and laptop computer. Output component 110 is further operable to transmit the indicator so as to point to the first buffered emergency service content and the second buffered emergency service content.

Controlling component 116 is operable to: control operation of receiving component 106 via control signal 120; control operation of reformatting component 108 via control signal 122; control operation of output component 110 via control signal 124; control operation of buffer 112 via control signal 126; and control operation of buffer 114 via control signal 128.

In operation, a user may want to stream content from HLS server 802. Home gateway 102 may begin by downloading a manifest file that contains all available stream bit rates and a list of segments for each available stream. At this point home gateway 102 may start downloading segments at the lowest available bit rate via signal 118, signal 896, and receiving component 106. Receiving component 106 may transmit the downloaded segments to output component 110 via signal 130. At this point, output component 110 may transmit the segments to HLS client 104.

At some point, after home gateway 102 is activated, EAS 804 may send an EAS message to receiving component 106 of home gateway 102 via signals 118 and 898. After receiving component 106 receives an EAS message, it may send the message to buffer 112 via signal 134. Receiving component 106 may additionally send the EAS message to reformatting component 108 via signal 132.

HLS client 104 may be outdated or be a device that is unable to process EAS messages in their original format. In this case, home gateway 102 has to reformat the EAS message into a format that is compatible with HLS client 104.

For example, some HLS clients currently support decoding of EAS messages that are in SCTE-18 format. Some home gateways may also send EAS notifications in proprietary EAS formats such as a modified EAS-CO format, a modified EAS-FT format, or a modified SCTE-18 format. In this example, presume that an HLS client only understands EAS notifications that are received in a proprietary format, and the SCTE-18 EAS messages should first be reformatted from the SCTE-18 format to a non-SCTE-18 message notification.

After reformatting component 108 has received the EAS message, notification component 109 therein may generate a reformatted EAS notification that is readable by HLS client 104. Notification component 109 may then send the reformatted EAS notification to buffer 114 via signal 136.

Further, some HLS clients currently support decoding of the EAS emergency service content from a particular format. Some home gateways may send the EAS emergency service content in proprietary formats that are not decodable by such HLS clients. In this example, presume that an HLS client is only able to decode the EAS emergency service content in an MPEG 2 format, and the original EAS emergency service content is provided in an H.264 format. In such a case, transcoding component 107 is able to transcode the original EAS emergency service content from MPEG 2 to H.254. Transcoding component 107 may then send the new transcoded EAS emergency service content to buffer 114 via signal 135.

Reformatting component 108 is therefore operable to provide a reformatted EAS message to buffer 114. The reformatting component 108 is also operable to provide transcoded EAS emergency service content.

After the original EAS message and the reformatted EAS message have been stored in buffer 112 and buffer 114, output component 110 may send an EAS notification to HLS client 104 via signal 142.

In an example embodiment, the EAS notification sent to HLS client 104 from home gateway 102 contains tags for both non-transcoded emergency service content and for transcoded emergency service content. The tag for non-transcoded content contains the location of the buffer 112 of home gateway 102 that stores the audio-video content of the EAS emergency service. The non-transcoded content tag, which may be a first universal resource indicator (URI1) allows HLS client 104 to find and play the EAS emergency service content in its original format such as an MPEG2 format. The tag for transcoded content contains the location of the buffer 114 of home gateway 102 that stores transcoded audio-video content of the EAS emergency service. The transcoded content tag, which may be a second universal resource indicator (URI2) allows HLS client 104 to find and play the transcoded EAS emergency service content in a format such as H.264.

In one example embodiment, the EAS notification sent to HLS client 104 may alert the user that an EAS message has been issued. At this time, the user may be given an option to tune to a different channel and view the EAS emergency service content or to disregard it. The ability to choose to view or disregard an EAS emergency service content by a user will be further described later.

In one example embodiment, the content of the EAS emergency service may have low priority or the user may choose not to view it. In this case the stored EAS emergency service content may be discarded and non-emergency content may continue to be sent from HLS 802 to HLS client 104 via home gateway 102 without interruption.

In yet another example embodiment, the priority of the EAS message may be high, in which case the user is not given a choice whether or not to view the EAS emergency service content and the EAS emergency service content is displayed automatically through HLS client 104.

If the user chooses to view the content of the EAS emergency service or the EAS message has a high priority, and the user has an HLS client 104 that is only able to process the EAS emergency service content in a transcoded format relative to the original content from the EAS 804, buffer 114 may send the EAS emergency service content to output component 110 via signal 140. Output component 110 may then send the transcoded EAS emergency service content via signal 142 to HLS client 104 to be displayed. This EAS emergency service content has been transcoded by transcoding component 107 of reformatting component 108. With embodiments of the present disclosure, if the content of the EAS emergency service uses an advanced coding format, the transcoded EAS emergency service content may be provided to HLS clients 104 that are only able to process an EAS emergency service content in an older format.

If the user chooses to view the EAS emergency service content or it has a high priority and the user has a device capable of displaying the EAS emergency service content in its originally-received format, buffer 112 may send the original EAS emergency service content to output component 110. Output component 110 may then send the EAS emergency service content to HLS client 104 to be viewed.

An EAS message is transmitted by EAS 804 OOB to home gateway 102. Receiving component 106 monitors for EAS messages. Home gateway 102 may receive an EAS message with sufficient time to notify HLS client 104. When the EAS emergency service content is provided, as indicated in the previously received EAS message, home gateway 102 tunes to the service and records the original EAS emergency service content and transcodes the original EAS emergency service content if needed.

Home gateway 102 may tune to an EAS service based on the originally received EAS message. For example, in situations where HLS client 104 is forced to tune to receive the content, the EAS message may provide home gateway 102 with a virtual channel number as a key for tuning. In another example, in situations where HLS client 104 may be able to override tuning to receive the content, the EAS message may provide home gateway 102 with additional information to obtain the EAS emergency service content at a later time. The additional information may include the frequency, modulation code and service number. In another example, in situations where the EAS message is provided in accordance with SCTE-18, the EAS message may indicate the sourceID, which uniquely identifies the service. In another example, in situations where the EAS message is provided as scrolling text in accordance with SCTE-18, the EAS message provides the scrolled text to home gateway 102. In all of these example, timing information is additionally provided by, or in some cases derived from, the EAS message. HLS client 104 may tune to the EAS emergency service or receive the scroll text based on timing information provided in the EAS message.

Figure 2:
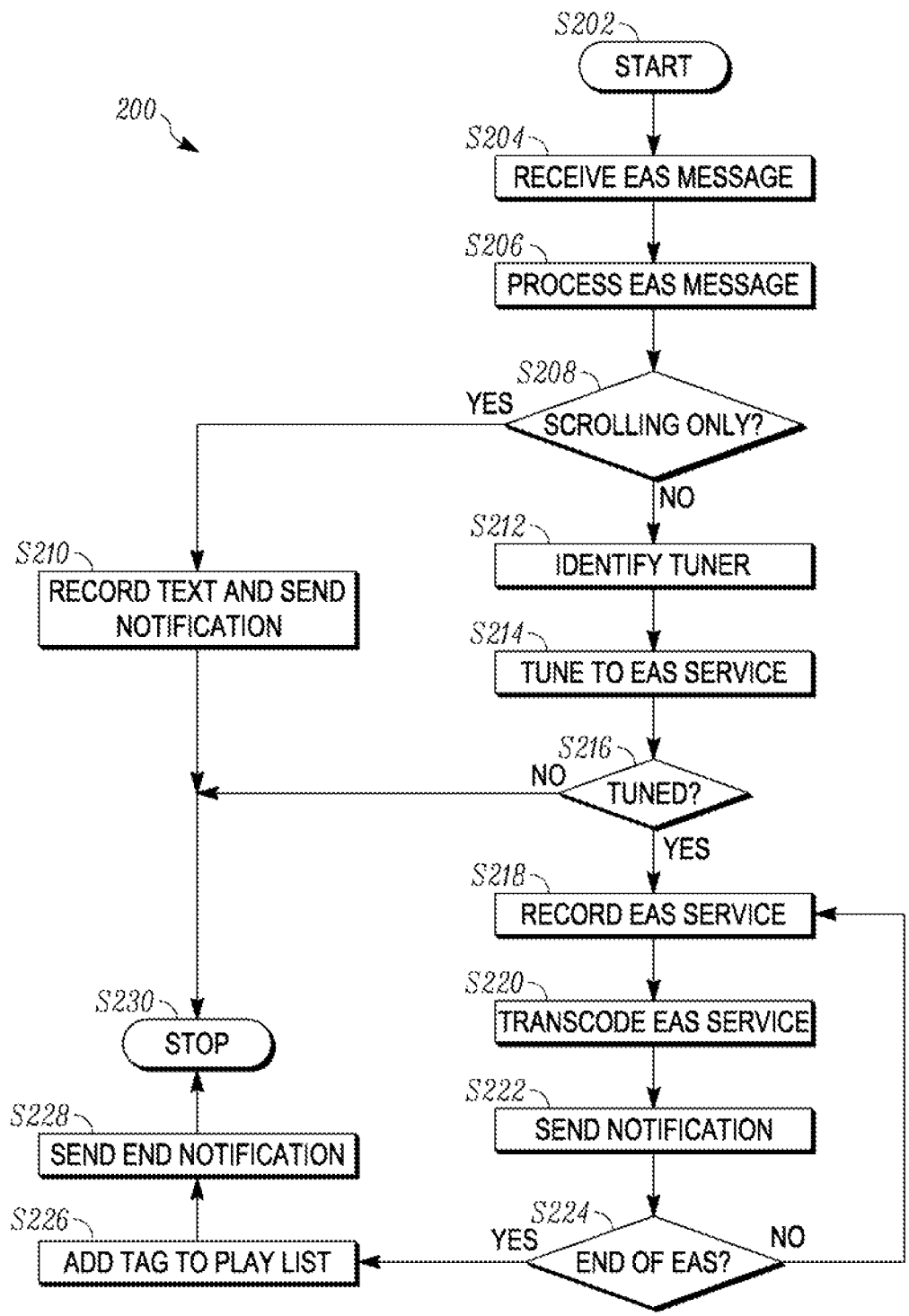
FIG. 2 illustrates a method of operating the home gateway of FIG. 1.

FIG. 2 illustrates a method 200 of operating home gateway 102 of FIG. 1.

Method 200 starts (S202), and home gateway 102 receives (S204) an EAS message from EAS 804. For example, EAS 804 sends an EAS message to receiving component 106 via signal 898 and 118.

After the EAS message has been received from EAS 804, the home gateway 102 may process the message and determine whether the message is valid (S206). For example, for purposes of discussion, let the EAS message be formatted in accordance with SCTE-18. In an example embodiment, controlling component 116 may instruct receiving component 106, via control signal 120, to analyze the EAS message in accordance with SCTE-18 to verify validity. If the EAS message is invalid, such as a duplicate message, home gateway 102 may discard the message. For example, controlling component 116 may instruct receiving component 106, via control signal 120, to delete the invalid EAS message.

If the message is valid, home gateway 102 may determine (S208) if the EAS message is a scrolling text-only EAS message. In an example embodiment, controlling component 116 may instruct receiving component 106, via control signal 120, to analyze the EAS message in accordance with SCTE-18 to determine if it is a scrolling text-only EAS message.

If the EAS message is a scrolling text-only EAS message (YES at S208), home gateway 102 may record the scrolling text and then send (S210) an EAS notification including the scrolling text to HLS client 104. For example, controlling component 116 may instruct receiving component 106, via control signal 126, to send the scrolling text EAS notification from 112 to output component 110. Controlling component 116 may then instruct output component 110, via control signal 124, to send the scrolling text EAS notification to HLS client 104 via signal 142.

After the scrolling text content of the EAS message concludes, method 200 stops (S230).

If the EAS message is not a scrolling text-only EAS message (NO at S208), home gateway 102 may identify (S212) which tuner path to use to receive the audio-video content indicated by a tuning message or a channel identifier within the EAS message payload.

There may be several tuner paths that home gateway 102 may override. In an example embodiment, a home gateway may have six tuner paths that can be overridden and used to receive the EAS emergency service content. In some embodiments, a home gateway may dedicate one tuner path, among a plurality of tuner paths, for all EAS emergency service content. In some embodiments, a home gateway may choose any tuner paths that are idle, e.g., any tuner path that is not currently receiving HLS content. In some embodiments, when all tuner paths are currently receiving HLS content, one is chosen to receive the EAS emergency service content, wherein the HLS content on that chosen path is discontinued. This will be described in greater detail below with reference to FIGS. 5-6.

After the tuner path has been found, home gateway 102 may tune (S214) to the EAS emergency service content frequency. For example, controlling component 116 may instruct receiving component 106, via control signal 120, to receive the EAS emergency service content from EAS 804.

It is then determined (S216) whether the tuning is successful. For example, if after the attempted tuning, receiving component 106 does not receive any EAS emergency service content, then is determined that the tuning was unsuccessful.

If tuning to the EAS message frequency is not successful (NO at S216), method 200 stops (S230).

If tuning to the emergency message frequency is successful (YES at S216), home gateway 102 may record (S218) the EAS emergency service content. For example, the EAS emergency service content may be recorded for HLS clients that are unable to process transcoded EAS emergency service content, e.g., EAS emergency service content that has been transcoded via transcoding component 107 of reformatting component 108 for a codec other than MPEG2. In an example embodiment, controlling component 116 instructs receiving component 106, via control signal 120, to send the received EAS emergency service content to buffer 112. Controlling component 116 then instructs buffer 112, via control signal 126, to store the EAS emergency service content. In an example embodiment, an MPEG2 uniform resource identifier (URI) is created for HLS clients that are unable to process a transcoded EAS emergency service content. The MPEG2 URI will be part of an EAS notification as will be discussed later.

At this point, home gateway 102 may transcode (S220) the EAS emergency service content. For example, the EAS emergency service content may be transcoded and recorded for devices that are not able to process originally-formatted EAS emergency service content. In an example embodiment, controlling component 116 instructs receiving component 106, via control signal 120, to additionally send the received EAS emergency service content to transcoding component 107 within reformatting component 108. Controlling component 116 then instructs transcoding component 107, via control signal 122 to transcode the EAS emergency service content and send the transcoded EAS emergency service content to buffer 114. After a playlist file has been produced, a URI is created to include in the EAS notification. In an example embodiment, where the received EAS emergency service content is in an MPEG2 format and is transcoded into an H.264 format, an H.264 URI is created. This H.264 URI will additionally be part of the EAS notification. Controlling component 116 then instructs buffer 114, via control signal 128, to store the transcoded EAS emergency service content.

Home gateway 102 may then send notification of the EAS message (S222). For example, controlling component 116 instructs output component 110, via control signal 124, to transmit an EAS notification to HLS client 104, via signal 142, alerting that there is EAS emergency service content that is available to be viewed.

It is then determined whether the EAS emergency service content has ended (S224). For example, controlling component 116 may monitor receiving component 106, via instruction signals 120, to determine if the EAS emergency service content has been completely received.

If the EAS emergency service content has not ended (NO at S224), then home gateway continues to record the EAS emergency service content (return to S218).

If the EAS emergency service content has been completely received (YES at S224), then an end tag is added to the EAS media playlist file (S226). For example, controlling component 116 may instruct output component 110, via control signal 124, to add an end tag to the EAS media play list.

A notification of the end of the EAS emergency service content is then provided (S228). For example, controlling component 116 may instruct output component 110, via control signal 124, to transmit a notification to HLS client 104, via signal 142, that the EAS emergency service content has come to an end (S228).

At this time, method 200 stops (S230).

FIGS. 1-2 generally describe the aspect of home gateway 102 reformatting an EAS message and storing EAS emergency service content. The reformatting may include transcoding the EAS emergency service content, generating an EAS notification, or both. The EAS message, the EAS notification, the original EAS emergency service content, and/or the transcoded EAS emergency service content may be stored in home gateway 102 for use by HLS client 104.

In an example embodiment, home gateway 102 will always reformat an EAS notification to a proprietary format that is compliant with SCTE-18. If an HLS client that can only process EAS notifications in accordance with SCTE-18 receives such a reformatted EAS notification, this type of HLS client will choose an appropriate URI from the EAS notification. Further, there may be situations where non-HLS clients are connected to home gateway 102 for recorded content playback over a Multimedia Over Coax Alliance (MoCA) network. Such non-HLS clients may have the capability to tune to receive an EAS message using built-in IB/OOB tuners. These non-HLS clients may receive the original EAS message and act accordingly.

Now that the operation of an example home gateway has been described, operation of an example HLS client will now be described with reference to FIGS. 3-4.

Figure 3:
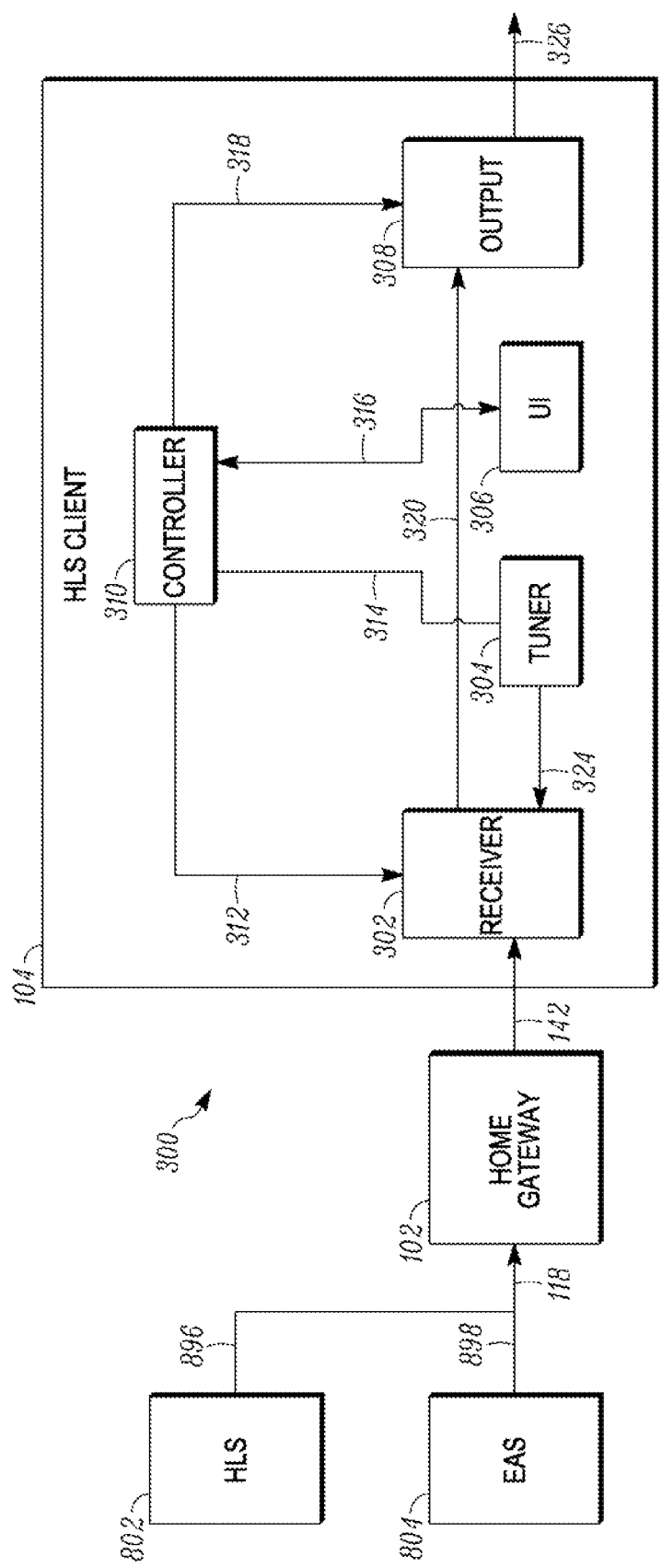
FIG. 3 illustrates the operation of an HLS client of FIG. 1 with a user interface system.

FIG. 3 illustrates HLS client 104 of FIG. 1 with a user interface system 300. Interface system 300 contains HLS server 802, EAS 804, home gateway 102, and HLS client 104. HLS client 104 further includes a receiving component 302, a tuning component 304, a user interface 306, an output component 308, and a controlling component 310. Controlling component 310 is operable to: control operation of receiving component 302 via control signal 312; control operation of tuning component 304 via control signal 314; control operation of user interface 306 via control signal 316; and control operation of output component 308 via control signal 318.

In this example, receiving component 302, tuning component 304, user interface 306, output component 308, and controlling component 310 are distinct components. However, in other embodiments, at least two of receiving component 302, tuning component 304, user interface 306, output component 308, and controlling component 310 may be combined as a unitary component. Further, in some embodiments, at least one of receiving component 302, tuning component 304, user interface 306, output component 308 and controlling component 310 may be implemented as a non-transient, tangible computer-readable media for carrying or having computer-executable instructions or data structures stored thereon.

Receiving component 302 is operable to receive streamed content from HLS server 802 or EAS emergency service content from EAS 804 via home gateway 102 (by way of signal 142) and transmit them to output component 308 via signal 320. Receiving component 302 is additionally operable to be tuned to a plurality of frequencies by tuning component 304 via signal 324. Receiving component 302 is operable to receive a sequence of HTTP downloads from the first HLS channel. Receiving component 302 is further operable to receive the audio-visual EAS emergency service content as directed.

Tuning component 304 is operable to tune receiving component 302 to a plurality of frequencies. Tuning component 304 tunes receiving component 302 based on an input from a user via user interface 306. More specifically, user interface 306 may instruct controlling component 310, via signal 316, that tuning component 304 should be tuned a new frequency. Controlling component 310 then instructs tuning component 304, via signal 314, to tune receiving component 302. In this example, at this point, presume that tuning component 304 is tuned to a first HLS channel. Tuning component 304, in response to the tuning instruction via signal 314 from controlling component 310, is operable to tune to a second HLS channel.

User interface 306, as mentioned above, is operable to instruct tuning component 304, via signal 316, controlling component 310, and signal 314, to tune receiving component 302, via signal 324, to desired frequencies based on an input from a user.

Output component 308 is operable to output video data based on the sequence of HTTP downloads from receiving component 302, via signal 320.

In operation, a user may want to stream data from HLS server 802. Home gateway 102 may begin downloading segments and transmitting them to HLS client 104 via signal 142 as described above in FIG. 1. Receiving component 302 may transmit the segments to output component 308 via signal 320. At this point, output component 308 may send each segment it receives to a display component (not shown) of HLS client 104 via signal 326. The operation of HLS client 104 continues this way until an EAS notification is broadcast (published) by home gateway 102. "EAS_START" and "EAS_END" EAS notification tags may be used to indicate the start and end of an EAS notification. The home gateway 102 may embed these EAS notification tags as part of a variant playlist file. The tags can include a EAS playlist file URI, the type of EAS (e.g., text, audio, video), the scrolling text (in the case of a scrolling text-only EAS message), a start time, an end time, a duration, and other information.

The HLS client 104 reads the variant playlist file and consequently reads the EAS_START tag. When an EAS notification is transmitted from home gateway 102 to HLS client 104, HLS client 104 may inform a user that EAS emergency service content is available. At this time a user is prompted via user interface 306 to decide whether or not to view the EAS emergency service content.

When the user indicates that the EAS emergency service content should be viewed, via user interface 306, user interface 306 instructs tuning component 304, via signal 316, controlling component 310, and signal 314, to tune receiving component 302, via signal 324, that it should tune receiving component 302 to the frequency at which the EAS emergency service content is being transmitted by home gateway 102. After tuning component 304 has tuned receiving component 302 to the frequency at which the EAS emergency service content is being transmitted, output component 308 may send each segment it receives to a display component (not shown) of HLS client 104 via signal 320. At the end of the EAS emergency service content, the HLS client 104 refers back to the variant playlist, tunes back to the original content, and starts playing the original content based on the time stamp.

In an alternate embodiment, the home gateway 102 embeds a reformatted EAS message (an EAS notification) in an in-band transport stream packet identifier (PID). A message filter in an HLS client 104 receives the PID, identifies the EAS notification, and processes the EAS notification as described previously with respect to the user interface 306. If the EAS emergency service content has been requested and shown, the HLS client 104 tunes back to the original content based on the media playlist.

In an example embodiment, presume that a user is watching a movie on HLS client 104, wherein the movie content is being provided by home gateway 102. When HLS client 104 receives an EAS notification from home gateway 102, an indication may be provided to the user. Non limiting examples of types of indications include: audio signals, such as a beeping noise super-imposed on the audio of the currently viewed movie; video or text signals, such as a banner super-imposed on the video of the currently viewed movie; or both audio and video signals. In some cases, for example when the alert priority value is above a predetermined threshold, the EAS emergency service content is immediately played. In some cases, for example when the alert priority value is below the predetermined threshold, the user may have an opportunity decide whether to immediately watch the EAS emergency service content, delete the EAS emergency service content, or watch the EAS emergency service content at a later time. In these cases, the user may instruct HLS client 104, for example by way of user interface 306, to perform the desired function of either immediately watch the EAS emergency service content, delete the EAS emergency service content, or watch the EAS emergency service content at a later time. If the EAS emergency service content is to be immediately watched, the user may instruct HLS client, via user interface 306, to immediately retrieve the EAS emergency service content from home gateway 102. If the EAS emergency service content is to be deleted, the user may instruct HLS client, via user interface 306, to instruct home gateway 102 to delete the EAS emergency service content. If the EAS emergency service content will be watched at a later time, the user may instruct HLS client, via user interface 306, to retrieve the EAS emergency service content from home gateway 102 at that later time.

When the user indicates, via user interface 306, that the EAS emergency service content should not be viewed, controlling component 310 sends no instructions to tuning component 304. With no instructions sent to tuning component 304 there is no change in the frequency to which receiving component 302 is tuned. Receiving component 302 may continue to receive segments that are being streamed from HLS server 802 and the EAS emergency service content is ignored.

Figure 4:
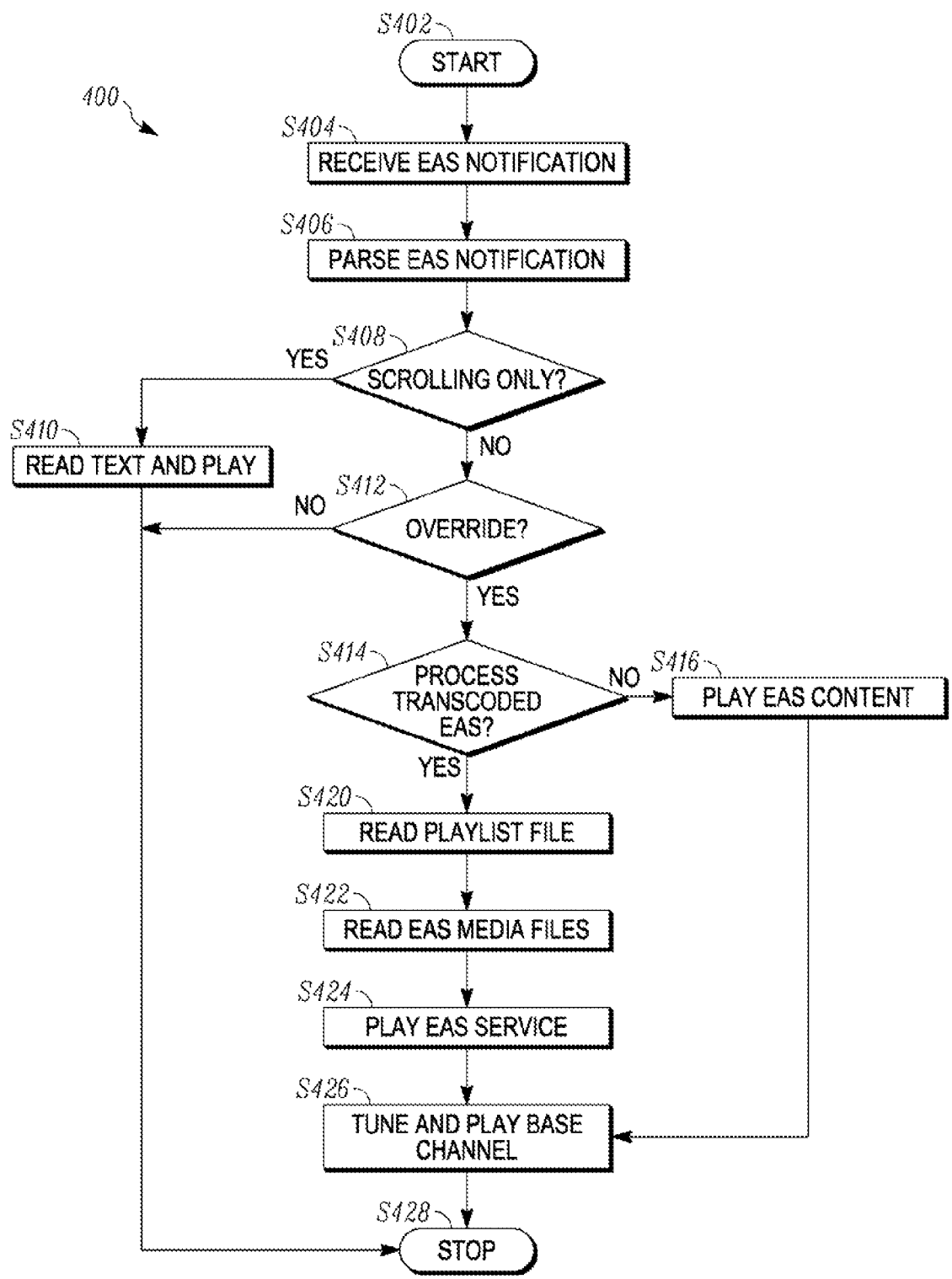
FIG. 4 illustrates a method of operating the HLS client of FIG. 3.

FIG. 4 illustrates method 400 of operating HLS client 104 of FIG. 3. HLS client 104 starts (S402) and an EAS notification is received (S404) from home gateway 102. For example, receiving component 302 receives an EAS notification via signal 142. The EAS notification may include a first tag to the location of non-transcoded content and a second tag to the location of transcoded content. The non-transcoded content tag contains the location of the original EAS emergency service content that is stored in buffer 112. The transcoded content tag contains the location of the transcoded EAS emergency service content that is stored in buffer 114.

After the EAS notification is received, it is parsed (S406). For example, controlling component 310 instructs receiving component 302, via control signal 312, to parse the message to find the alert priority value to determine what type of EAS message has been sent.

It is then determined (S408) whether the EAS notification indicates a scrolling text-only EAS message. For example, receiving component 302 may analyze the EAS notification in accordance with SCTE-18 to determine whether the EAS notification includes a scrolling text-only emergency message.

If the notification indicates a scrolling text EAS message (YES at S408), HLS client 104 may play (S410) the scrolling text EAS message. For example, controlling component 310 may instruct receiving component 302, via control signal 312, to obtain the scrolling text EAS message payload from home gateway 102. After receipt, controlling component 310 may then instruct receiving component 302 to send the scrolling text to output component 308, via signal 320. Controlling component 310 may then instruct output component 308, via signal 318, to send the scrolling text to the display component (not shown) of HLS client 104 via signal 326. After the text concludes, HLS client 104 may stop playing the emergency text EAS message and method 400 stops (S428).

If the notification does not indicate a scrolling text EAS message (NO at S408), it is determined (S412) whether the EAS emergency service content should be overridden. For example, HLS client 104 may check the priority and alert priority value within the notification and determine whether or not to override the currently tuned service. In some embodiment, an HLS client may be configured not to play the EAS emergency service content until actuated by a user, e.g., by way of a user interface.

If there is if there is no EAS override (NO at S412), HLS client 104 will continue playing the current HLS content and method 400 stops (S428). This is the case where the user of HLS client 104 does not want to play the EAS emergency service content.

If there is an EAS override (YES at S412), it is then determined (S414) whether HLS client 104 is a device that is unable to process a transcoded EAS emergency service content. For example, if receiving component 302 is unable to read the transcoded EAS emergency service content files, then HLS client 104 may be considered to be a device that is unable to process the transcoded EAS emergency service content. Similarly, if receiving component 302 is able to read the transcoded EAS emergency service content, then HLS client 104 may be considered to be a device that is able to process the transcoded EAS emergency service content.

If HLS client 104 is a device that is unable to process (NO at S414) the transcoded EAS emergency service content, then the EAS emergency service content in its original format from EAS 804 is played (S416) until receipt of an EAS end notification. For example, controlling component 310 may instruct receiving component 302, via control signal 312, to obtain the EAS emergency service content in its original format from buffer 112 in home gateway 102. The transcoded EAS emergency service content is then played on the HLS client.

In as much, controlling component 310 may instruct tuning component 304, via signal 314, to tune to the EAS emergency service content. Controlling component 310 then enables tuning component 304, via control signal 314, to instruct receiving component 302, via signal 324 to obtain the EAS emergency service content from home gateway 102. In this case, receiving component 302 will be using the non-transcoded emergency service content stored in buffer 112 of home gateway 102. After receipt, controlling component 310 may then instruct receiving component 302 to send the audio-video content to output component 308, via signal 320. Controlling component 310 may then instruct output component 308, via signal 318, to send the audio-video content to the display component (not shown) of HLS client 104 via signal 326.

HLS client 104 then tunes to the base channel (S426). For example, controlling component 310 enables tuning component 304, via control signal 314, to instruct receiving component 302, via signal 324 to return to the HLS content from home gateway 102. Thus, after the EAS emergency service content is completed, receiving component 302 is tuned to continue playing HLS playlist such that the HLS content continues at the point where it was interrupted to view the EAS emergency service content. After the EAS message concludes, method 400 stops (S428).

If HLS client 104 is a device that is able to process the transcoded EAS emergency service content (YES at S414), the transcoded playlist file is read (S420). For example, receiving component 302 may use the tags contained in the EAS notification to find the playlist and begin reading audio-video content in buffer 114 of home gateway 102.

HLS client 104 then reads (S422) the EAS media files in accordance with the playlist. For example, receiving component 302 will be using the transcoded content tag contained in the EAS notification to access the transcoded EAS media file stored in buffer 114 of home gateway 102.

The EAS emergency service content is played until receipt of an end notification or an end tag in the playlist (S424). The end tag signals receiving component 302 to indicate an end of the EAS emergency service content. HLS client 104 then tunes to the base channel (S426) as previously described.

FIGS. 3-4 generally describe the aspect of HLS client 104 benefiting from an EAS notification. In particular, with this aspect, home gateway 102 first sends an EAS notification to HLS client 104. Home gateway 102 tunes to the EAS service, records the EAS emergency service content and transcodes the EAS emergency service content. The URI of the original EAS emergency service content and the URI of the transcoded EAS emergency service content are provided to HLS client 104 as part of the EAS notification. Depending on the capability of HLS client 104, HLS client 104 chooses the appropriate URI. From the point of view of the of HLS client 104, HLS client 104 is able to receive the EAS notification and decide whether to watch the EAS emergency service content immediately, thus stopping the viewing of the current HLS content, or to continue to watch the current HLS content an watch the EAS emergency service content later (or not at all).

The discussion above with reference to FIGS. 1-4 generally describe embodiments wherein the home gateway or HLS client has a single tuner. Other aspects include HLS clients having a plurality of tuners. These aspects will be now described in greater detail with reference to FIGS. 5-7.

Figure 5:
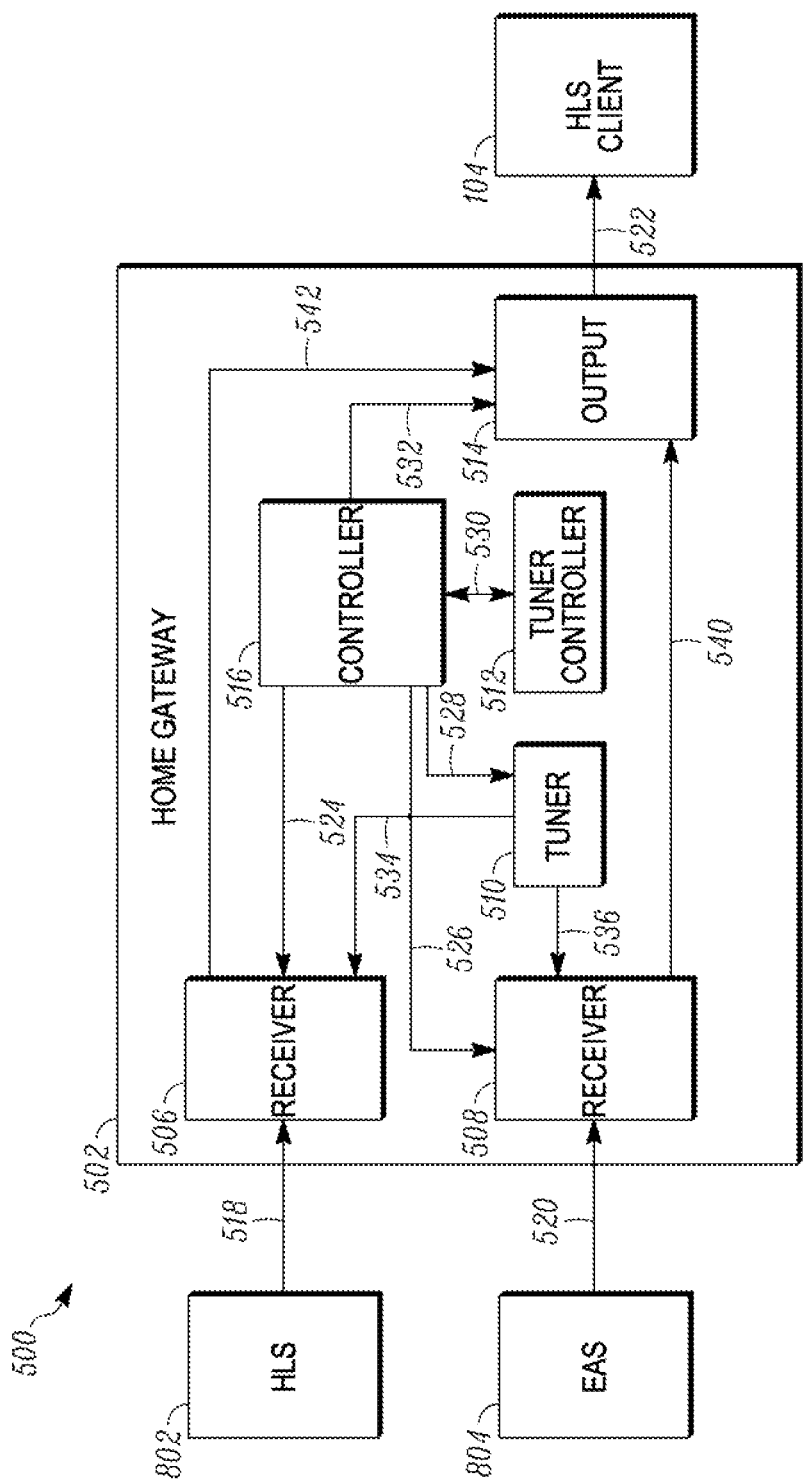
FIG. 5 illustrates an example multi-tuner system that contains a home gateway with a second tuner.

FIG. 5 illustrates a multi-tuner system 500 that contains a home gateway with a second tuner. Multi-tuner system 500 contains HLS server 802, EAS 804, a home gateway 502, and an HLS client 104.

Home gateway 502 is operable to receive segments being streamed from HLS server 802 via signal 518 and to receive an EAS message from EAS 804 via signal 520. Home gateway 502 is additionally operable to transmit downloaded segments to be played, via signal 522, to HLS client 104. Home gateway 502 further includes a receiving component 506, a receiving component 508, a tuning component 510, a tuning controller 512, an output component 514, and a controlling component 516.

Controlling component 516 is operable to: control operation of receiving component 506 via control signal 524; control operation of receiving component 508 via control signal 526; control operation of tuning component 510 via control signal 528; control operation of tuning controller 512 via control signal 530; and control operation of output component 514 via control signal 532.

In this example, each of receiving component 506, receiving component 508, tuning component 510, tuning controller 512, output component 514, and controlling component 516 are distinct components. However, in other embodiments, at least two of receiving component 506, receiving component 508, tuning component 510, tuning controller 512, output component 514, and controlling component 516 may be combined as a unitary component. Further, in some embodiments at least one of tuning component 510, tuning controller 512 and controlling component 516 may be implemented as a non-transient, tangible computer-readable media for carrying or having computer-executable instructions or data structures stored thereon.

In operation, a user may want to stream video content from HLS server 802. When the user indicates a desire to stream video content from HLS server 802, tuning controller 512 may instruct controlling component 516, via signal 530, that receiving component 506 should be tuned to the frequency at which HLS server 802 is streaming video content. Controlling component 516 then instructs tuning component 510, via signal 528, to tune receiving component 506, via signal 534, to the frequency at which HLS server 802 is streaming video content. Tuning component 510 then sends tuning signal 534 to receiving component 506. Tuning signal 534 may instruct receiving component 506 to tune to the frequency at which HLS server 802 is streaming video content. As the segments are received, receiving component 506 may transmit the segments to output component 514 via signal 542. At this point, output component 514 may transmit the downloaded segments to be played, via signal 522, to HLS client 104.

Tuning component 510 is operable to send a first tuning signal to receiving component 506, via signal 534, and to send a second tuning signal to receiving component 508, via signal 536. Each of the first tuning signal and the second tuning signal is based signal 528 from controlling component 516, which is based on signal 530 from tuning controller 512. Tuning component 510, based on signal 528, may send tuning signal 536 to receiving component 508. Tuning signal 536 may instruct receiving component 508 to tune to the frequency at which EAS 804 is transmits EAS emergency service content.

Tuning controller 512 is operable to send a control signal to tuning component 510, via signal 530, controlling component 516, and signal 528. Tuning controller 512 is further operable to output the control signal when receiving component 508 is not receiving any HTTP downloads. Tuning controller 512 is yet further operable to output the control signal when receiving component 508 is not receiving any video-on-demand downloads.

Receiving component 506 is operable to receive segments being streamed from HLS server 802 via signal 518. Receiving component 506 is additionally operable to tune, based on the first tuning signal, to a first HLS channel to receive a first sequence of HTTP downloads. Receiving component 508 is operable to receive an EAS message from EAS 804 via signal 520. Receiving component 508 is additionally operable to tune, based on the second tuning signal, to a second HLS channel to receive EAS emergency service content.

Output component 514 is operable to output segments received by receiving component 506 or EAS emergency service content received by receiving component 508 to HLS client 504.

At some time, EAS 804 may transmit an EAS message. The EAS message may be received by receiving component 508. At this point, output component 514 may transmit an indicator to HLS client 504 indicating that EAS emergency service content is available to be viewed. A user may choose to view or not view the EAS emergency service content as through a user interface as described above in FIG. 3.

Multi-tuner system 500, where the home gateway includes two tuners, is but one example. Other example embodiments may include additional tuners.

Figure 6:
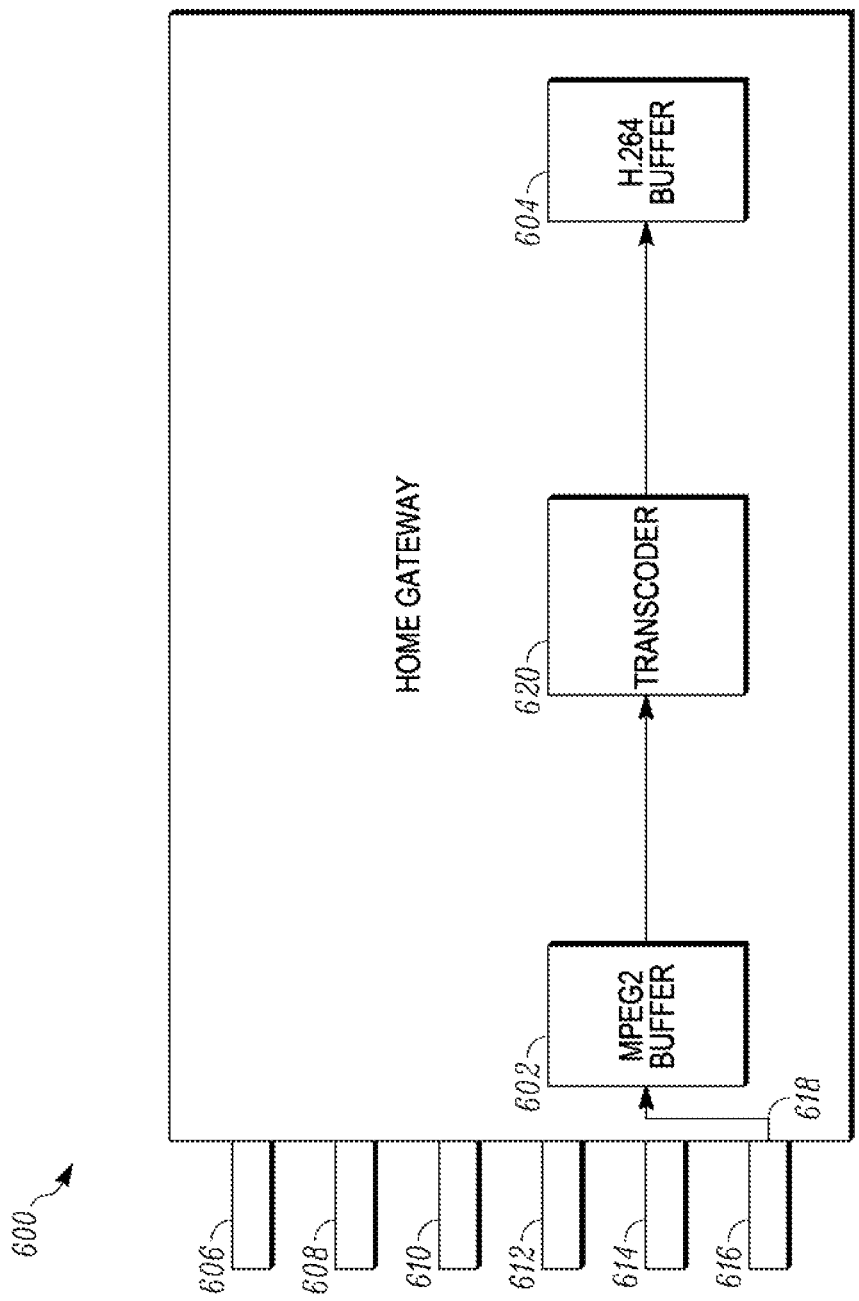
FIG. 6 illustrates an example home gateway having six tuners.

FIG. 6 illustrates an example home gateway 600 having six tuners. As shown in the figure, home gateway 600 includes a tuner 616 coupled to a first buffer 602 for storing EAS emergency service content in its received format of MPEG2, in this example. A transcoder 620 transcodes the MPEG2-formatted content to H.264-formatted content, for example, and stores it in a second buffer 604. An EAS notification transmitted from the home gateway 600 can include a first universal resource indicator (URI1) to the first buffer 602 and a second universal resource indicator (URI2) to the second buffer 604. An HLS client can use one of the URIs to access a compatible EAS emergency content format for display to the user. Home gateway 600 additionally includes receiving components 606, 608, 610, 612, and 614. For purposes of brevity, an included tuner and output component are not shown or discussed here but were previously described in conjunction with FIGS. 1 and 5.

In some embodiments one of receiving components 606, 608, 610, 612, 614 and 616 may be dedicated to receiving EAS messages from an EAS. For example, as shown in the figure, receiving component 616 may be dedicated to receiving EAS messages.

In other examples, any one of receiving components 606, 608, 610, 612, 614 and 616 that is idle may be assigned to receive EAS emergency service content. For purposes of discussion, an idle receiving component may be one that is not assigned to an HLS client and which is either not recording or is engaged with a channel that is not classified as a favorite. In the event that each receiving component is recording, then one of the recordings may be terminated to tune to the EAS emergency service content.

Figure 7:
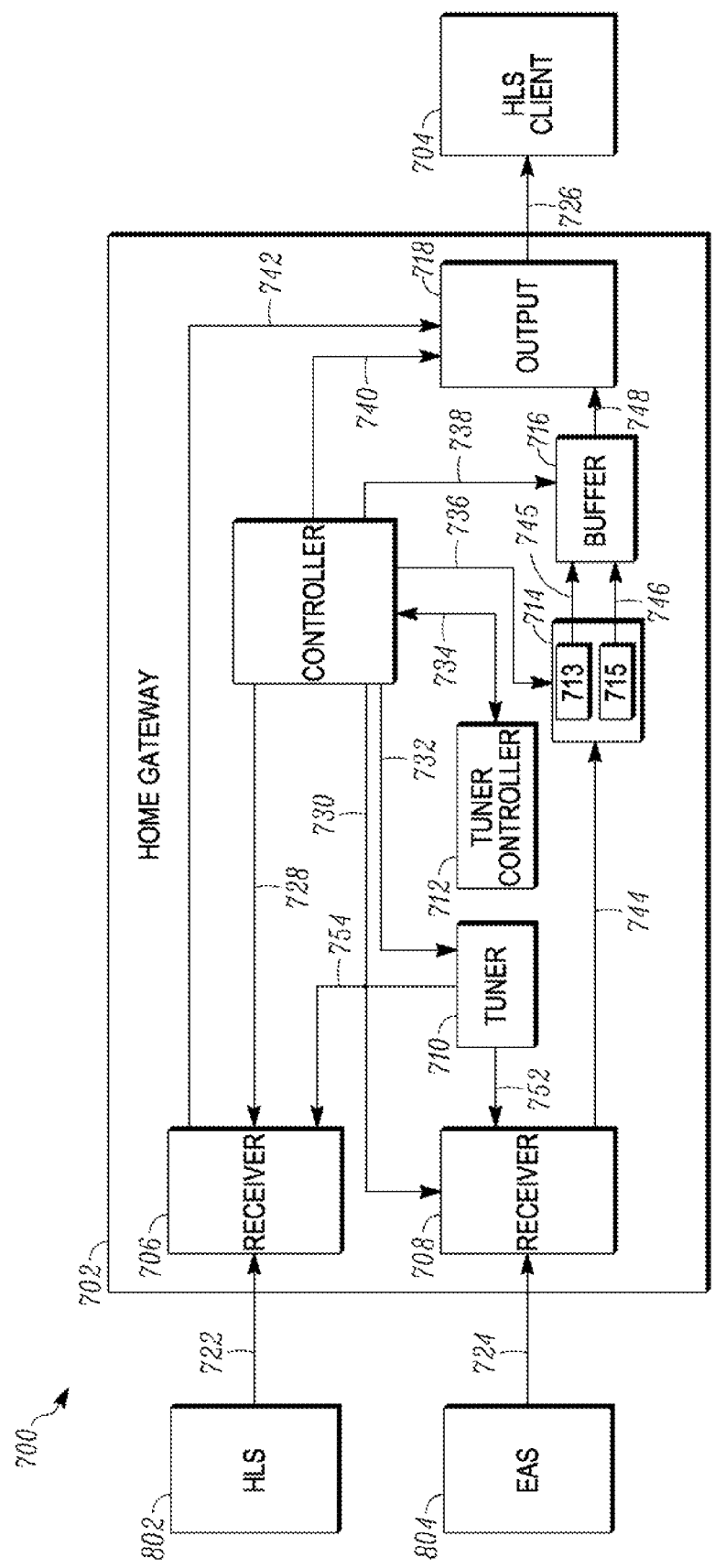
FIG. 7 illustrates an example multi-tuner communication/reformatter system.

FIG. 7 illustrates an example home gateway/reformatter system 700. Home gateway/reformatter system 700 includes HLS server 802, EAS 804, a home gateway 702, and an HLS client 704.

Home gateway 702 is operable to receive segments being streamed from HLS server 802 via signal 722 and to receive EAS emergency service content from EAS 804 via signal 724. Home gateway 702 is additionally operable to transmit downloaded segments to be played, via signal 726, to HLS client 704. Home gateway 702 further includes a receiving component 706, a receiving component 708, a tuning component 710, a tuning controller 712, a reformatting component 714, a buffer 716, an output component 718, and a controlling component 720. Reformatting component 714 includes a transcoding component 713 and a notification component 715.

In this example, each of receiving component 706, receiving component 708, tuning component 710, tuning controller 712, reformatting component 714, buffer 716, output component 718, and controlling component 720 are distinct components. However, in other embodiments, at least two of receiving component 706, receiving component 708, tuning component 710, tuning controller 712, reformatting component 714, buffer 716, output component 718, and controlling component 720 may be combined as a unitary component. Further, in some embodiments at least one of tuning component 710, tuning controller 712, and reformatting component 714 may be implemented as a non-transient, tangible computer-readable media for carrying or having computer-executable instructions or data structures stored thereon.

Similarly, in this example, transcoding component 713 and notification component 715 are distinct components. However, in other embodiments, transcoding component 713 and notification component 715 may be combined as a unitary component. Further, in some embodiments, at least one of transcoding component 713 and notification component 715 may be implemented as a non-transient, tangible computer-readable media for carrying or having computer-executable instructions or data structures stored thereon.

Controlling component 720 is operable to: control operation of receiving component 706 via control signal 728; control operation of receiving component 708 via control signal 730; control operation of tuning component 710 via control signal 732; control operation of tuning controller 712 via control signal 734; control operation of reformatting component 714 via control signal 736; control operation of buffer 716 via control signal 738; and control operation of output component 718 via control signal 740.

In operation, the initiation of system 700 is similar to that of system 500 of FIG. 5 as discussed above. A user may want to stream data from HLS server 802. Tuning controller 712 may instruct, via signal 734, controlling component 720 to instruct, via signal 732, tuning component 710 to send tuning signal 754 to tune receiving component 706 to the frequency at which HLS server 802 is transmitting segments. As receiving component 706 receives segments, via signal 722, it transmits them, via signal 742, to output component 718, which then sends the segments to HLS client 704 via signal 726.

Tuning controller 712 may instruct tuning component 710, via signal 734, controlling component 720, and signal 732. When tuning component 710 receives signal 732, it may send tuning signal 752 to receiving component 708. Tuning signal 752 may tune receiving component 708 to the frequency at which EAS 804 transmits EAS emergency service content.

At some time, EAS 804 may transmit an EAS message to receiving component 708 via signal 724. Receiving component 708 may send the EAS message to reformatting component 714 via signal 744.

Similar to that discussed above with reference to FIG. 1, an EAS notification may need to be reformatted for particular HLS client. In such instances, after reformatting component 714 has received the EAS message, notification component 715 therein may generate a reformatted EAS notification. Notification component 715 may then send the reformatted EAS notification to buffer 716 via signal 746.

Further, similar to that discussed above with reference to FIG. 1, the EAS emergency service content may need to be transcoded for particular HLS clients. In such instances, transcoding component 713 is able to transcode the originally provided EAS emergency service content. Transcoding component 713 may then send the transcoded EAS emergency service content to buffer 716 via signal 745.

Reformatting component 714 is therefore operable to provide a reformatted EAS message to buffer 716 as an EAS notification. In some cases, the EAS notification is provided by notification portion 715 with a pointer to transcoded EAS emergency service content as provided by transcoding component 713.

Buffer 716 may later send the transcoded EAS emergency service content to output component 718 via signal 748 as instructed by controller 720 via signal 738.

While the message is being transcoded and stored by reformatting component 714, receiving component 706 may continue to send segments downloaded from HLS server 802, to output component 718 via signal 742. After the EAS emergency service content has been transcoded and stored, output component 718 may send an EAS notification to HLS client 704 via signal 726.

In an example embodiment, the EAS notification sent to HLS client 704 from home gateway 702 contains a tag for transcoded content. The tag for transcoded content contains the location of the buffer 716 of home gateway 702 that stores transcoded audio-video content of the EAS emergency service. The transcoded content tag, which may be a second universal resource indicator (URI2) allows HLS client 704 to find and play the transcoded EAS emergency service content in a format such as H.264.

After the indicator has been received by HLS client 704, a user may use an interface to indicate whether or not to view the EAS emergency service content. In one example embodiment, the user may decide not to view the EAS emergency service content. In this case output component 718 may continue to transmit segments of HLS content from receiver 706 to HLS client 704, and the reformatted EAS emergency service content may be discarded.

In another example embodiment, the user may decide that they want to view the EAS emergency service content. In this case, buffer 716 may transmit the transcoded EAS emergency service content to output component 718 via signal 748. At this point, output component 718 may transmit the transcoded EAS emergency service content to HLS client 704. After the EAS emergency service content has concluded, receiving component 706 may resume transmitting downloaded segments from HLS server 802 to output component 718. Output component 718 may then resume transmitting downloaded segments of media to HLS client 704 via signal 726.

One of the benefits of example systems disclosed herein is that there is minimal recording or viewing disruption when an EAS message is issued. The tuner with the lowest priority may be disconnected and may be used to tune to the EAS emergency service content. Also when an EAS message is issued, a user may be given the choice of whether or not they want to view the associated emergency service content or ignore it. This also helps minimize disruption when an EAS message is issued.

Another benefit of example systems disclosed herein is transcoding EAS emergency service content into a usable format for devices that are unable to process EAS emergency service content in a format other than its original format from an EAS. Currently, when an EAS emergency service content is issued, it may be in a format that cannot be used by some devices. In this case the EAS content cannot be viewed. Transcoding the EAS content into a second format enables the EAS message to be viewed by users of all types of HLS clients.

In accordance with embodiments presented, a home gateway receives an EAS message from an EAS. The gateway may store the originally received EAS message and may additionally store a reformatted EAS message. The reformatted EAS message may be an EAS notification. Some HLS clients may receive the originally received EAS message from the home gateway. Other HLS clients may receive the EAS notification. Upon receipt of the EAS notification, the user of an HLS client may be able to perform one of: immediately watch the EAS emergency service content, thus interrupting currently viewed content; delete the EAS emergency service content without interrupting currently viewed content, but missing the EAS emergency service content; or watch the EAS emergency service content at a later time without interrupting currently viewed content. Further, some HLS clients may be a multi-tuner system, wherein the EAS emergency service content is provided to an idle tuner. Accordingly, the ongoing recordings of the HLS client are not disturbed.

The foregoing description of various preferred embodiments have been presented for purposes of illustration and description. It is not intended to be exhaustive or to limit the example systems disclosed herein to the precise forms disclosed, and obviously many modifications and variations are possible in light of the above teaching. The example embodiments, as described above, were chosen and described in order to best explain the principles and practical applications to thereby enable others skilled in the art to best utilize the example systems disclosed herein in various embodiments and with various modifications as are suited to the particular use contemplated. It is intended that the scope of the example systems disclosed herein be defined by the claims appended hereto.

What is claimed is:

1. A home gateway comprising:
   a first receiving component;
   a second receiving component;
   a controlling component operable to output a controlling signal;
   a tuning component operable to output, based on the controlling signal, a first tuning signal and a second tuning signal, wherein:
   said first receiving component is operable to tune, based on the first tuning signal, to a first hypermedia-information-based media streaming communications protocol channel to receive a first sequence of hypermedia-information-based media downloads, and
   said second receiving component is operable to receive, based on the second tuning signal, an emergency alert system service content on a second hypermedia-information- based media streaming communications protocol channel;
   a first buffer operable to store the received emergency alert system service content;
   a second buffer operable to store transcoded emergency alert system service content; and
   an output component operable to output an emergency alert notification that includes a first tag identifying a location of the received emer enc alert service content in the first buffer and a second tag identifying a location of the transcoded emergency alert system service content in the second buffer.

2. The home gateway of claim 1, wherein said controlling component is operable to output the controlling signal when said second receiving component is not receiving any hypermedia-information-based media downloads.

3. The home gateway of claim 1, wherein said controlling component is operable to output the controlling signal when said second receiving component is not receiving any video-on-demand downloads.

4. The home gateway of claim 1, wherein said controlling component is operable to output the controlling signal such that said second receiving component is dedicated to the second hypermedia-information-based media streaming communications protocol channel to receive an emergency alert system service.

5. The home gateway of claim 1, further comprising:
   a reformatting component,
   wherein the emergency alert system content comprises an emergency alert system message is in a first format,
   wherein said reformatting component is operable to output a reformatted emergency alert system message in a second format, the reformatted emergency alert system message being based on the received emergency alert system message.

6. The home gateway of claim 5, further comprising an output component operable to output an emergency alert system notification, based on the reformatted emergency alert system message, to a client device.

7. The home gateway of claim 5,
   wherein the received emergency alert system message comprises an MPEG2 format, and wherein the transcoded emergency alert system message comprises a H.264 format.

8. A method for operating a home gateway comprising:
outputting, via a controlling component, a first control signal and a second control signal;
outputting, via a tuning component and based on the first control signal, a first tuning signal;
outputting, via the tuning component and based on the second control signal, a second tuning signal;
tuning, by a first receiving component and based on the first tuning signal, to a first hypermedia-information-based media streaming communications protocol channel to receive a first sequence of hypermedia-information-based media downloads;
tuning, by a second receiving component and based on the second tuning signal, to a second hypermedia-information-based media streaming communications protocol channel to receive an emergency alert system service;
storing, via a first buffer, the received emergency alert system service as a first buffered message;
storing, via a second buffer, the transcoded emergency alert system service as a second buffered message; and
outputting, via an output component and to a client device, an emergency alert notification that includes a first tag identifying a location of the received emergency alert system service in the first buffer and a second tag identifying a location of the transcoded emergency alert service in the second buffer.

9. The method of claim 8, wherein said outputting a controlling signal comprises:
outputting the controlling signal when the second receiving component is not receiving any hypermedia-information-based media downloads.

10. The method of claim 8, wherein said outputting a controlling signal comprises:
outputting the controlling signal when the second receiving component is not receiving any video-on-demand downloads.

11. The method of claim 8, wherein said outputting a controlling signal comprises:
outputting the controlling signal such that the second receiving component is dedicated to the second hypermedia-information-based media streaming communications protocol channel to receive an emergency alert system service.

12. The method of claim 8, further comprising:
outputting, via a reformatting component, a transcoded emergency alert system service in an H.264 format,
wherein the emergency alert system service comprises an emergency alert system in an MPEG2 format.

13. The method of claim 12, further comprising:
outputting, via an output component, an emergency alert system notification to a client device based on the reformatted emergency alert system message.

14. The method of claim 12, further comprising:
wherein the received emergency alert system message comprises an MPEG2 format,
wherein the transcoded emergency alert system message comprises a H.264 format.

\* \* \* \* \*